(12) United States Patent
Spanner et al.

(10) Patent No.: US 7,542,149 B2
(45) Date of Patent: Jun. 2, 2009

(54) OPTICS SYSTEM FOR AN INTERFEROMETER THAT USES A MEASURING MIRROR, A REFERENCE MIRROR AND A BEAM DEFLECTOR

(75) Inventors: Erwin Spanner, Traunstein (DE); Herbert Huber-Lenk, Nuβdorf/Sondermoning (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 352 days.

(21) Appl. No.: 11/244,478

(22) Filed: Oct. 6, 2005

(65) Prior Publication Data
US 2007/0188767 A1   Aug. 16, 2007

(30) Foreign Application Priority Data
Oct. 11, 2004   (DE) ................ 10 2004 049 646

(51) Int. Cl.
*G01B 11/02* (2006.01)
(52) U.S. Cl. .................. 356/498; 356/492; 356/493
(58) Field of Classification Search ............... 356/498, 356/152.3, 622, 492, 493
See application file for complete search history.

(56) References Cited

U.S. PATENT DOCUMENTS 5,148,235 A * 9/1992 Tank et al. ............... 356/455
5,333,048 A    7/1994 Michel et al.
6,369,951 B1   4/2002 Spanner
2003/0053073 A1 * 3/2003 Hill .......................... 356/498
2003/0197870 A1 * 10/2003 Bagwell et al. ............ 356/493

FOREIGN PATENT DOCUMENTS

EP    0 481 356 B1    9/1995
EP    1 031 868 B1    5/2003

* cited by examiner

*Primary Examiner*—Tarifur Chowdhury
*Assistant Examiner*—Michael LaPage
(74) *Attorney, Agent, or Firm*—Brinks Hofer Gilson & Lione

(57) ABSTRACT

An optical assembly of an interferometer that includes a beam splitter for dividing the beams emitted by a radiation source into at least one measuring and one reference beam and at least one measuring and one reference mirror, on which the measuring and the reference beams impinge, wherein at least one of the mirrors can be displaced along a measuring axis. The optical assembly further includes a beam deflector, as well as a retro-reflector, wherein the measuring and the reference beams reflected at the measuring and the reference mirrors via the beam deflector and the retro-reflector are guided at least a second time in the direction toward the measuring and the reference mirrors and wherein the beam deflector is embodied as a plane-parallel plate.

4 Claims, 4 Drawing Sheets

OPTICS SYSTEM FOR AN INTERFEROMETER THAT USES A MEASURING MIRROR, A REFERENCE MIRROR AND A BEAM DEFLECTOR

RELATED APPLICATIONS

Applicants claim, under 35 U.S.C. §119, the benefit of priority of the filing date of Oct. 11, 2004 of a German patent application, copy attached, Serial Number 10 2004 049 646.3, filed on the aforementioned date, the entire contents of which is incorporated herein by reference.

BACKGROUND

1. Technical Field

The present invention relates to an optical assembly of an interferometer, which can be used in particular as a so-called multi-axis interferometer and includes a beam splitter, at least one measuring and one reference mirror, wherein at least one of the mirrors can be displaced along a measuring axis, and of a beam deflector, as well as a retro-reflector.

2. Background Information

The positions of movable objects to be measured can be determined in a highly precise manner with the aid of interferometers. In this case, a measuring mirror is arranged on the respective object to be measured, at which the measuring beams generated by the interferometer are reflected and are superimposed on reference beams, which are reflected at a reference mirror, which customarily is stationary. Besides position detection along a single measuring axis, interferometers, which can detect movements of objects to be measured around and along several measuring axes, are becoming increasingly important, in particular in the semiconductor industry, for example in connection with wafer steppers or wafer scanners. In this connection, these are identified as so-called multi-axis interferometers.

OBJECTS AND SUMMARY OF THE INVENTION

It is an object of the present invention to disclose an optical assembly of an interferometer, which allows a precise position determination with respect to one or several axes of measurements. The employment of individual assemblies which can be produced as simply as possible is required in this case, besides a compact structure.

This object is attained by an optical assembly of an interferometer that includes a beam splitter for dividing the beams emitted by a radiation source into at least one measuring and one reference beam and at least one measuring and one reference mirror, on which the measuring and the reference beams impinge, wherein at least one of the mirrors can be displaced along a measuring axis. The optical assembly further includes a beam deflector, as well as a retro-reflector, wherein the measuring and the reference beams reflected at the measuring and the reference mirrors via the beam deflector and the retro-reflector are guided at least a second time in the direction toward the measuring and the reference mirrors and wherein the beam deflector is embodied as a plane-parallel plate.

An interferometer can be constructed by means of such an optical assembly, which furthermore comprises a radiation source, as well as at least one detector, on which the measuring and the reference beams impinge and there generate an output signal as a function of a displacement.

The above object is attained by an optical assembly of an interferometer that includes a beam splitter for dividing the beams emitted by a radiation source into at least one measuring and one reference beam and at least one measuring and one reference mirror, arranged along at least two measuring axes, on which the measuring and the reference beams impinge, wherein respectively at least one of the mirrors can be displaced along the respective measuring axis. The optical assembly further includes a beam deflector, as well as a retro-reflector, wherein the measuring and the reference beams reflected at the measuring and the reference mirrors via the beam deflector and the retro-reflector are guided at least a second time in the direction toward the measuring and the reference mirrors. An axis splitter, arranged between the beam deflector and the retro-reflector, divides the measuring and the reference beams so as to be parallel to the at least two measuring axes, wherein the axis splitter includes at least one plane-parallel plate.

It is possible by such an optical assembly to construct an interferometer, which furthermore includes a radiation source, as well as at least two detectors, on which the measuring and the reference beams impinge after the second reflection at the measuring and the reference mirrors in at least two axes of measurement and respectively generate an output signal as a function of a displacement.

Now, in accordance with the above two mentioned independent aspects of the present invention, components of an optical assembly which are particularly simple to produce as plane-parallel plates are employed at various locations in the beam path of the interferometer. In this way it is possible to meet the requirements regarding the needed optical precision, as well as the requirement for cost-efficient manufacture.

This in particular applies to the use of suitable plane-parallel plates as beam deflectors, as well as axis splitters, in the beam path of the interferometer.

In comparison with a beam splitter cube acting as a beam deflector, a plane-parallel plate can be produced relatively simply by so-called double-sided optical polishing. Added to this is that two plane-parallel plates as the beam splitter and beam deflector can be spatially arranged in a very compact manner and make possible a small structural size of a corresponding optical assembly.

Similar advantages also result if one or several plane-parallel plates function as axis splitters of a multi-axis interferometer. If alternatively to this, approximately prismatic bodies, such as rhomboids and/or roof prisms are used, meeting geometric requirements in regard to angularity and pyramidal errors, is relatively expensive. Added to this is that as a rule such variations require the cementing together of different components, which in turn results in cementing errors.

Moreover, based on the selected beam paths, complete symmetry of the optical path lengths of the measuring and the reference beam paths is assured, so that a high degree of drift stability, for example with respect to temperature fluctuations, is assured during the operation. This in particular results from the high degree of symmetry of the optical beam paths, especially because the measuring and the reference beams always penetrate the identical (or like) optical components in parallel, and thermal drift, for example, has the same effect on both beams and is therefore compensated in regard to the interference signal.

The above identified object is furthermore attained by an optical assembly of an interferometer that includes a beam splitter for dividing the beams emitted by a radiation source into at least one measuring and one reference beam and at least one measuring and one reference mirror, on which the measuring and the reference beams impinge, wherein at least one of the mirrors can be displaced along a measuring axis. The optical assembly further includes a beam deflector, as well as a retro-reflector, wherein the measuring and the reference beams reflected at the measuring and the reference mirrors via the beam deflector and the retro-reflector are guided at least a second time in the direction toward the measuring and the reference mirrors wherein, prior to impinging on a detector, the measuring and the reflection beams pass a second time through the beam splitter, which includes a neutral splitter which combines the measuring and the reference beams upstream of the detector.

It is possible by such an optical assembly to construct an interferometer which furthermore includes a radiation source, as well as at least one detector, on which the measuring and the reference beams impinge after the second reflection at the measuring and the reference mirrors, and generate there an output signal as a function of a displacement.

In accordance with a further independent aspect of the present invention, in the case of embodying the interferometer as a heterodyne interferometer, it is possible to do without a relatively expensive half-wave plate in the returning beam path, if a beam splitter layer of the beam splitter at the output side is not designed as a polarization beam splitter, but as a neutral beam splitter. By this the returning measuring and reference beams can directly mix. In the course of this an additional signal beam is created, which is phase-shifted by 180°, but which need not be used for evaluation. In order to assure optical path length symmetry, it is alternatively possible to employ a suitably dimensioned, considerably less expensive small glass plate in place of the half-wave plate.

The above mentioned object is furthermore attained by an optical assembly of an interferometer that includes a beam splitter for dividing the beams emitted by a radiation source into a measuring and a reference beam and at least one measuring and one reference mirror, arranged along at least two measuring axes, on which the measuring and the reference beams impinge, wherein respectively at least one of the mirrors can be displaced along the respective measuring axis. The optical assembly further includes a beam deflector, as well as a retro-reflector, wherein the measuring and the reference beams reflected at the measuring and the reference mirrors via the beam deflector and the retro-reflector are guided at least a second time in the direction toward the measuring and the reference mirrors. An axis splitter, arranged between the beam deflector and the retro-reflector, divides the measuring and the reference beams so as to be parallel to at least two axes, wherein a measuring and a reference mirror is co-linearly arranged along each measuring axis.

It is possible by such an optical assembly to construct an interferometer which furthermore includes a radiation source, as well as at least two detectors, on which the measuring and the reference beams impinge after the second reflection at the measuring and the reference mirrors in the at least two axes, and respectively generate an output signal as a function of a displacement.

In accordance with a further independent aspect of the present invention, a co-linear arrangement, or a co-linear path of the measuring and the reference beam paths is also provided in a multi-axis interferometer. It is assured by this, that the measuring and the reference beams are propagated as long a possible under comparable conditions of their surroundings. In contrast to this, in arrangements in accordance with the prior art these beams extend vertically with respect to each other and in different components, i.e. under different conditions of their surroundings. A high degree of drift stability is achieved by the present invention.

Further advantages, as well as details of the instant invention, ensue from the following description of exemplary embodiments by the attached drawing figures.

BRIEF DESCRIPTION OF THE DRAWINGS

FIG. 2b shows a spatial plan view of an embodiment of a triple prism used in FIG. 2a;

FIG. 2c is a view from above on an embodiment of a reference mirror used in FIG. 2a;

FIG. 2d is a view from above on an embodiment of a measuring mirror used in FIG. 2a;

DETAILED DESCRIPTION OF THE PREFERRED EMBODIMENTS

Figure 1:
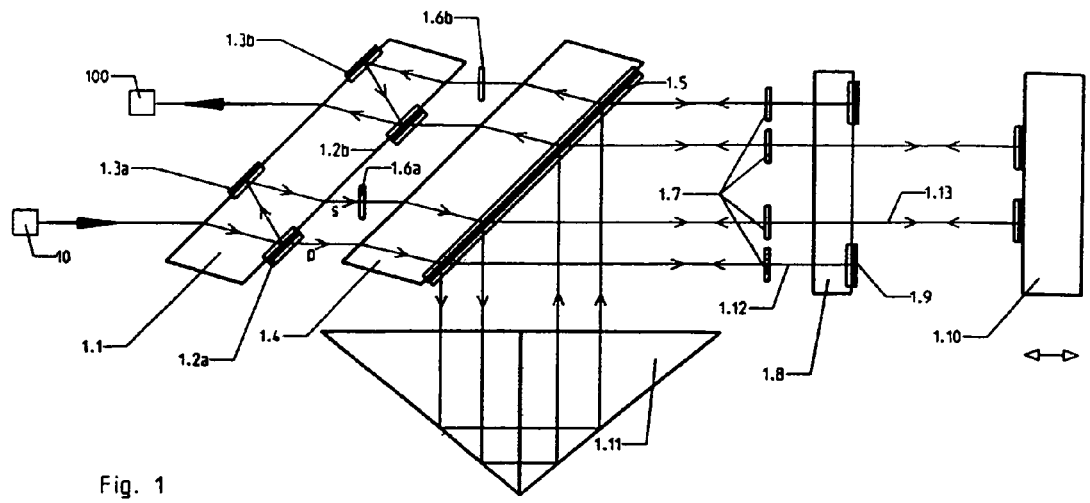
FIG. 1 shows a schematic plan view of a beam path in a first exemplary embodiment of an interferometer with an optical assembly in accordance with the present invention, wherein the interferometer is designed as a single-axis interferometer.

The basic optical principle of a single-axis interferometer, which is constructed in accordance with the principle of a differential plane-mirror interferometer and in which a first exemplary embodiment of an optical assembly in accordance with the present invention is employed, is represented in FIG. 1.

A beam emitted from a radiation source 10, for example a laser with differently polarized beam portions, is split up into two parallel beams at a beam splitter 1.1 in the form of a plane-parallel beam splitter plate, which is arranged inclined, preferably at 45°. Such a beam splitter is for example known from EP 1 031 868 B1 of Applicant.

The p-polarized portion of the beam coming from the direction of the radiation source 10, which is refracted at the entry glass surface of the beam splitter plate, is transmitted by a polarizing beam splitter layer 1.2a at the outlet glass surface, the s-polarized portion is reflected and is again reflected at a highly reflecting mirror layer 1.3a on the entry glass surface of the beam splitter plate. In this way two parallel, orthogonally polarized beams are generated, whose parallelism is merely a function of the parallelism of the beam splitter plate, which can be easily assured.

A beam deflector 1.4, also designed as a plane-parallel plate, is arranged at a distance from the beam splitter 1.1. A parallel beam pair preferably initially passes through it after having been refracted at the entry glass surface, and then impinges on a polarizing beam splitter layer 1.5 at the outlet glass surface. So that the s-polarized beam can be transmitted by this beam splitter layer 1.5, the s-polarized beam is rotated by 90° in its polarization direction by a half-wave plate 1.6a between the beam splitter 1.1 and the beam deflector 1.4. In this way the beams, which are now both linearly p-polarized, can be transmitted by the beam deflector 1.4. Subsequently both beams pass through quarter-wave plates 1.7, which change the polarization state from linearly polarized to circularly polarized, and thereafter pass through a second plane-parallel plate, called reference mirror 1.8 in what follows, which has a rear surface mirror 1.9 for one of the two beam bundles. The beam impinging on this rear surface mirror 1.9 is used as the reference beam 1.12 in the interferometer.

Alternatively to the embodiment represented in FIG. 1, the reference mirror 1.8 can also be laid out as a surface mirror, however, for maintaining the uniformity of the optical path lengths, the reference mirror for the measuring beam should then have a bore.

The measuring and the reference beams 1.13 and 1.12 are reflected back into each other by the measuring mirror 1.10 and the reference mirror 1.8 and, following the second passage through the quarter-wave plates 1.7, are again rotated by 90° in their polarization direction. The two now s-polarized beams are reflected at the polarizing beam splitter layer 1.5 of the beam deflector 1.4 and enter a retro-reflector 1.11, which is preferably designed as a triple prism or a triple mirror. Offset parallel and point-reflected, the measuring and the reference beams 1.13, 1.12 are again reflected from the retro-reflector 1.11 to the beam deflector 1.4 and again deflected by the polarizing beam splitter layer 1.5 in the direction toward the quarter-wave plates 1.7, the reference mirror 1.8 and the measuring mirror 1.10. At least one of the measuring mirror 1.10 and the reference mirror 1.8, preferably the measuring mirror 1.10, is arranged to be displaceable in the measuring direction or axis indicated by the arrow. The beams, again reflected back into each other, now again have a p-polarization following the renewed passage through the quarter-wave plates 1.7, and are therefore now transmitted by the beam splitter layer 1.5 of the beam splitter 1.4. In a beam path symmetrical with the above described incident beam path, they are passed back via the half-wave plate 1.6b and the highly reflective mirror 1.3b for the reference beam 1.12, and directly for the measuring beam 1.13, to the polarizing beam splitter layer 1.2b of the beam splitter 1.1. There the s- and p-polarized beams are superimposed on each other and are available as output signal beams at the interferometer, or at the schematically indicated detector 100.

The evaluation of the output signal beam in regard to the measurement signal which is actually of interest differs, depending on whether a homodyne interferometer principle or a heterodyne interferometer principle is employed. In connection with a homodyne interferometer it is possible, for example, to use a polarization-optical phase detector for the generation of phase-shifted individual signals, such as is described in EP 0 481 356 B1 of Applicant. In the case of a heterodyne interferometer, the different frequencies of the measuring and the reference beams coded with respect to the polarization direction are mixed by means of a polarizer and are present as a measurement beat signal, which can be compared with a reference beat signal.

In case of an intended heterodyne evaluation it is possible to omit the expensive half-wave delay plate 1.6b located in the returning beam path, provided the beam splitter layer 1.2b at the interferometer output is laid out as a neutral splitter instead. In this way the measuring and the reference beams can directly mix and in the process an additional signal beam, phase-shifted by 180°, is created, but which need not be used for evaluation. For compensating the missing optical path in the half-wave plate 1.6b, a cost-effective small glass plate can be inserted.

The optical interferometer principle which can be realized by the optical assembly in accordance with the present invention has special advantages in particular for its use as heterodyne interferometer. In connection with conventional Michelson interferometers in accordance with the prior art, which utilize a beam splitter cube as the beam splitter, a mixing of polarities of the different frequency portions of the measuring and the reference beams occurs after the first reflection at the measuring mirror, in particular in the embodiment in the form of a plane-mirror or differential plane-mirror interferometer, which leads to non-linearity within a signal period. In accordance with the above described optical principle, following their splitting up at the beam splitter layer 1.2a until their recurring superimposition at the layer 1.2b, the measuring and the reference beams travel along spatially separate paths, which do not permit further mixing of polarization. Therefore the problem of polarization mixing is substantially limited to the requirements for quality made on the beam splitter layers 1.2a and thus considerably reduces the non-linearity within a signal period.

Air-glass boundary faces, not particularly identified in FIG. 1, are customarily coated for reducing reflections. Furthermore, the plate of the reference mirror 1.8 can have a slight wedge shape for avoiding interfering reflections.

Alternatively to the variation with the movable measuring mirror 1.10 represented in FIG. 1, it can also be provided for the reference mirror 1.8 to perform the measuring movement, while the measuring mirror is arranged to be stationary.

Figure 2A:
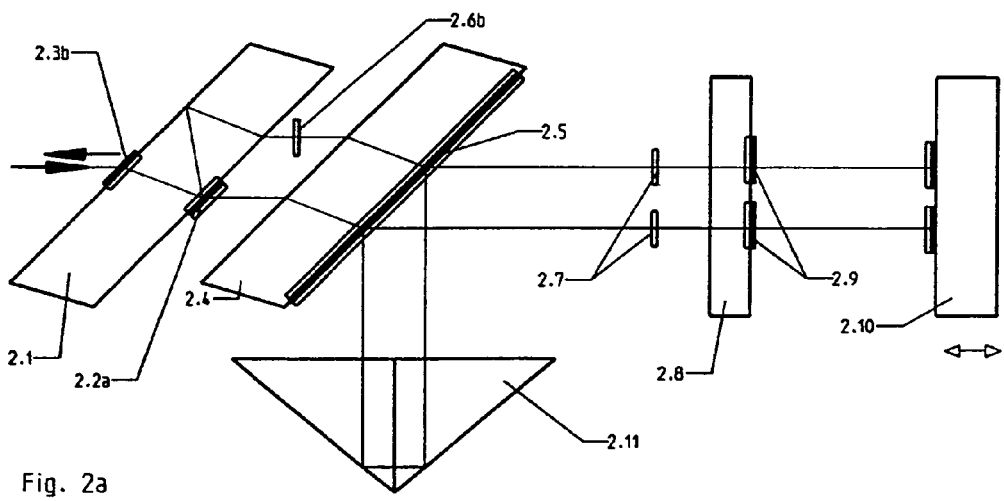
FIG. 2a represents a slightly modified variation of the exemplary embodiment in FIG. 1.

The above explained FIG. 1 shows the basic principle of the present invention, wherein the reflection of the beams takes place in the drawing plane by the retro-reflector 1.11, or the triple prism employed for this purpose. For improved understanding, a purely two-dimensional beam path is created by this. For optimization, or respectively for the reduction of the structural volume and for reducing the spatial beam pattern, in a further embodiment of the interferometer in accordance with the invention in FIG. 2a the reflection of the beams by the point reflection at the retro-reflector 2.11, or the triple prism, now takes place in accordance with a diagonal pattern. In this case the reflected measuring beam extends outside of the drawing plane below (or above) the reference beam. Respectively the opposite applies to the reflection of the reference beam. Otherwise, the optical beam path corresponds to the one in the previous example. Accordingly, in the embodiment of FIG. 2a, a beam passes through layer 2.3b and is split up into two parallel beams at an inclined beam splitter 2.1. One portion of the beam is refracted at the entry surface of the beam splitter 2.1 is transmitted by a beam splitter layer 2.2a at the outlet surface. The other portion of the beam is reflected by layer 2.2a and is again reflected at an entry surface of beam splitter 2.1. In this way two parallel beams are generated by beam splitter 2.1 and which enter a beam deflector 2.4 that is arranged at a distance from the beam splitter 2.1. A parallel beam pair preferably initially passes through the beam deflector 2.4 after having been refracted at the entry surface, and then impinges on a beam splitter layer 2.5 at the outlet surface of the beam deflector 2.4. Prior to entering the beam deflector 2.4, one of the beams generated by beam splitter 2.1 passes through a half-wave delay plate 2.6b. The beams generated by beam deflector pass through Quarter-wave delay plates 2.7.

Figures 2B, 2C, 2D:
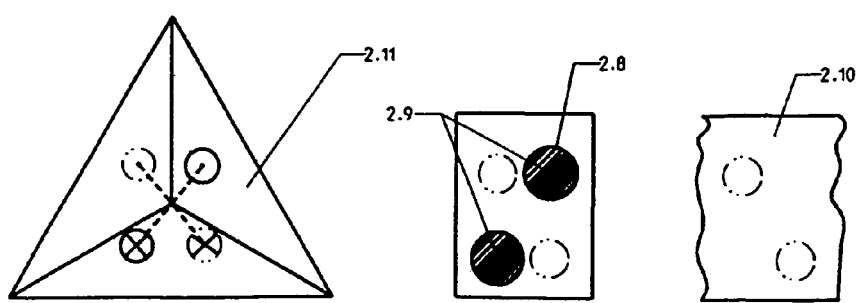

In a view from the top of the entry surface of the retro-reflector 2.11, or of the triple prism, FIG. 2b shows the diagonal beam pattern of the reflection of the measuring and the reference beams. FIG. 2c shows the mirror arrangement 2.9, required for the diagonal arrangement of the reference beam at least in these areas, on the plate of the reference mirror 2.8. The correspondingly axis-mirrored diagonal pattern of the measuring beams is indicated in dashed lines. The plate of the reference mirror 2.8 must be transparent at least in these areas.

The corresponding pattern is also formed on the measuring mirror 2.10 and is represented in FIG. 2d in a view from above on the surface of the measuring mirror 2.10.

The optical interferometer principle explained by FIG. 1 can also be expanded to multi-axis interferometers. To this end, the beam path of the described single-axis interferometer is realized several times parallel with itself.

It is particularly advantageous to split the interferometer beam path onto the required plurality of axes following the first reflection at the measuring and the reference mirror, and after the beam deflection at the beam splitter layer of the beam splitter.

In this way it is possible not only to detect spacing movements of the measuring mirror along a measuring axis by interferometry, but also—knowing the distances between the axes—tilting movements of the measuring mirror by measuring techniques.

Splitting the interferometer beam path onto several axes (preferably two or three) can take place in principle ahead of the retro-reflector, or triple prism, as well as downstream of it. It is particularly advantageous to perform this split downstream of the retro-reflector, since in this case no separate retro-reflector, or triple prism, is required for each individual measuring axis, but instead an appropriate component can be used simultaneously for all measuring axes, so that the cost of these particularly expensive components can be saved.

Figure 3:
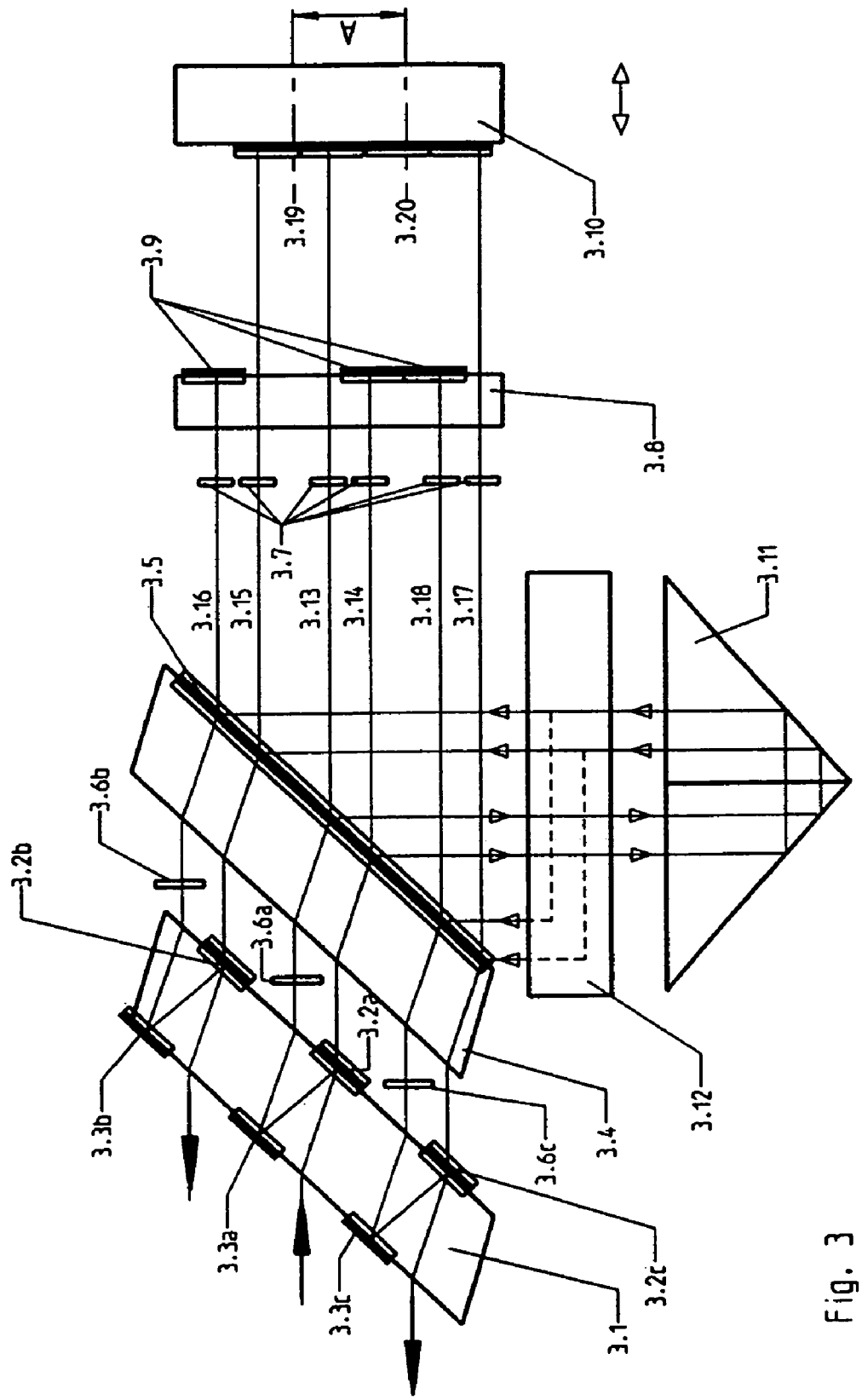
FIG. 3 shows a schematic plan view of the beam path in a further exemplary embodiment of an interferometer with an optical assembly in accordance with the present invention, wherein the interferometer is designed as a multi-axis interferometer.

FIG. 3 shows in a schematic form the interferometer beam path for such a multi-axis interferometer with two measuring axes, in which a further embodiment of the optical assembly in accordance with the invention is employed. As shown in FIG. 3, a beam passes through an entry surface of inclined beam splitter 3.1 and is split up into two parallel beams. One portion of the beam is transmitted by a beam splitter layer 3.2a at the outlet surface of the beam splitter 3.1. The other portion of the beam is reflected by layer 3.2a and is again reflected at layer 3.3a (located between reflecting layers 3.3b and 3.3c) so as to leave the beam splitter 3.1. In this way two parallel beams are generated by beam splitter 3.1 and which enter a beam deflector 3.4 that is arranged at a distance from the beam splitter 3.1. A parallel beam pair preferably initially passes through the beam deflector 3.4 after having been refracted at the entry surface, and then impinges on a beam splitter layer 3.5 at the outlet surface of the beam deflector 3.4. Prior to entering the beam deflector 3.4. one of the beams generated by beam splitter 3.1 passes through a half-wave delay plate 3.6a positioned between plates 3.6b and 3.6c. The beams generated by beam deflector pass through quarter-wave delay plates 3.7. Thus, the beams from the radiation source are split into measuring beam 3.13 and a reference beam 3.14 via a beam splitter 3.1 and beam deflector 3.4 that are similar in structure as beam splitter 1.1 and beam deflector 1.4, respectively. As with the system of FIG. 1, the measuring and reference beams are directed to quarter-wave delay plates 3.7 and their respective mirrors 3.10 and 3.8 (with rear reflection surfaces 3.9) which are structurally similar to mirrors 1.10 and 1.8, respectively. The measuring and reference beams are reflected off of their respective mirrors towards the beam deflector 3.4 wherein the beams are reflected towards an axis splitter 3.12 and retro-reflector 3.11. The required split-up onto the different measuring axes takes place by the structural element called an axis splitter 3.12 in what follows. In FIG. 3, it is only shown schematically in regard to its functioning, actual exemplary embodiments will be explained in the course of the further description.

In what follows, the basic beam path in the multi-axis interferometer in FIG. 3 will be explained to the extent in which it differs from the single-axis variations of the previous examples.

The pair of beams reflected back into themselves by the measuring mirror 3.10 and the reference mirror 3.8, from now on called the primary measuring beam 3.13 and the primary reference beam 3.14, is split into two pairs of beams by the axis splitter 3.12, following their reflection at the retro-reflector 3.11, or the triple prism. Therefore not only one, from now on so-called secondary first beam pair for the secondary measuring beam pair 3.15 and for the secondary reference beam pair 3.16, is provided, but also at least one further secondary second beam pair with a further secondary measuring beam pair 3.17 and a further secondary reference beam pair 3.18. This is the substantial difference of a multi-axis interferometer in comparison with the previously explained single-axis variations.

Now the two secondary beam pairs present downstream of the axis splitter 3.12 pass, each one by itself, over analogous beam paths, as described in FIG. 1. Now, because of the guidance of the beam paths, is not only one interferometer output signal generated, but two, namely at the respective beam splitter layers 3.2b and 3.2c.

The two effective measuring axes 3.19 and 3.20 are each located in the center of the optical axes of the primary and secondary measuring beams at the location of the measuring mirror 3.10. With the help of knowing the distance A between the two effective measuring axes 3.19 and 3.20, it is then possible by the measuring signals at the two interferometer outputs to determine, besides the determination of the distance change of the measuring mirror 3.10, also the tilt angle of the measuring mirror 3.10 around an axis of rotation perpendicularly with respect to the drawing plane.

For better understanding, the interferometer beam path was again represented in FIG. 3 only in the drawing plane. In a preferred variation, the beams reflected by the retro-reflector 3.11, or respectively the triple prism, no longer extend in the drawing plane but, analogously to the example in FIG. 2, outside of it.

Different actual embodiment options of the axis splitter 3.12 of the multi-axis variation in FIG.3, such as can be used in connection with an optical assembly in accordance with the invention, will be described in what follows by FIGS.4 and 5. In other words, it is contemplated that the system of FIG.3 is altered by replacing the axis splitter 3.12 with the structures of either FIG.4 or FIG.5. In these alterations, the beam splitter 3.1 and beam deflector 3.4 are again used to form measuring and reference beams that are directed to their respective mirrors 3.10 and 3.8. The measuring and reference beams are reflected off of their respective mirrors towards the beam deflector 3.4 wherein the beams are reflected towards the retroreflector 3.11 and then towards the structures of either FIG.4 or FIG.5 which then send secondary beams towards the beam deflector 3.4, the measuring and reference mirrors and at least a pair of detectors as will be described below.

A plane-parallel plate, such as represented in FIG. 1 in the form of a beam splitter 1.1. can for example be used as axis splitter for two needed measuring axes.

Figure 4:
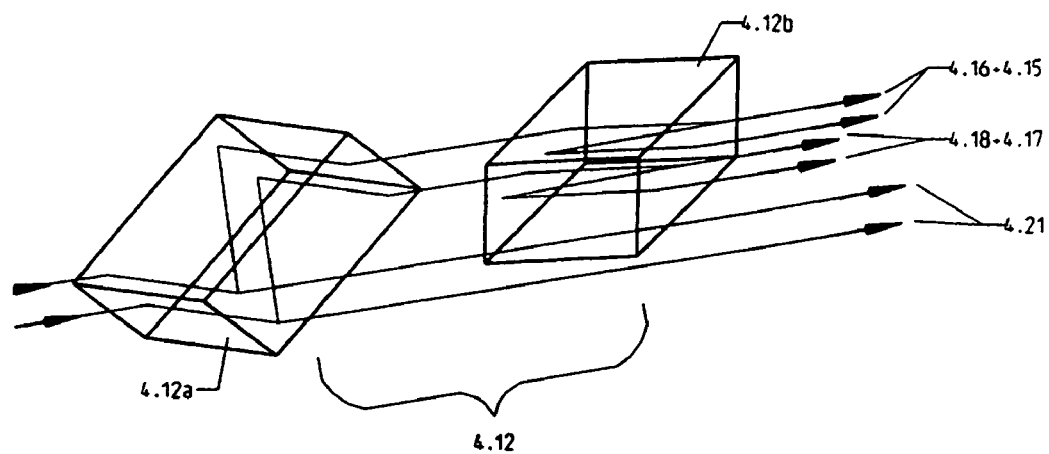
FIGS. 4 and 5 each show further embodiments of a suitable axis splitter, such as can be used in a multi-axis interferometer in accordance with FIG. 3, in accordance with the present invention.

FIG. 4 shows an axis splitter 4.12 for three measuring axes, wherein two beam splitter plates 4.12a, 4.12b are used, which are arranged crosswise. As in the example in FIG. 3, a parallel pair including measuring and reference beams enters the axis splitter 4.12. This pair of beams is divided onto two planes by the first beam splitter plate 4.12a. The beam pair 4.21 extends in the first plane. The upper beam pair is split by the beam splitter plate 4.12 in the plane into two beam pairs 4.16, 4.15 and 4.18, 4.17.

In this way the beam pair entering the axis splitter 4.12 is divided, respectively as three parallel beam pairs, onto two planes. For the sake of clarity, the coatings on the beam splitter plates 4.12a, 4.12b have not been drawn in FIG. 4.

A beam splitter element, or axis splitter, based on plane-parallel plates, such as represented in FIG.4 of EP 1031 868 B1, can be designed, or used, not only by transmission, but also by reflection. FIG. 5 shows an embodiment of an axis splitter 5.12 suitable for a three-axis interferometer, using two plane-parallel plates 5.1, 5.2, which are crossed and preferably turned by 45 degrees with respect to each other and are used for beam-splitting by reflection. In this case the beam splitter of the measuring beam 5.3 and the reference beam 5.4 takes place at a polarization-optically neutral beam splitter layer on the first glass surface of the plane-parallel plate 5.2 and not at the second glass surface, as in the transmitting glass beam splitter plate in the example of FIG. 4. The beam transmitted into the plane-parallel plate in the course of the beam splitting is reflected by a rear surface mirror and, after refraction at the first glass surface, exits parallel with the beam split by reflection. The portions of the measuring and the reference beams reflected at the surface of the plane-parallel plate 5.1 are merely reflected at the second plane-parallel plate 5.2. The portions of the measuring and the reference beams transmitted at the neutral splitter layer at the first glass surface of the plane-parallel plate 5.1 are reflected at a rear surface mirror, are refracted at the first glass surface and are split at the first glass surface of the second plane-parallel plate 5.2 by a further neutral splitter layer. The transmitted portions are in turn reflected at a further rear surface mirror and, following refraction, exit from the second plane-parallel plate 5.2. In this way the beam pair entering the axis splitter 5.12 is split, divided on two levels, into three parallel beam pairs, which are identified by the reference numerals 5.16×5.15, 5.18×5.17, and 5.21 in the drawing figure. In FIG. 5, the various coatings have again not been drawn in for the sake of clarity.

The advantage of using reflecting beam splitters made from plane-parallel plates in comparison with transmitting beam splitters lies in that the beam path can be folded out of the plane. It is thus possible to clearly reduce the structural size of the interferometer housing, or the mounting surface.

Figure 5:
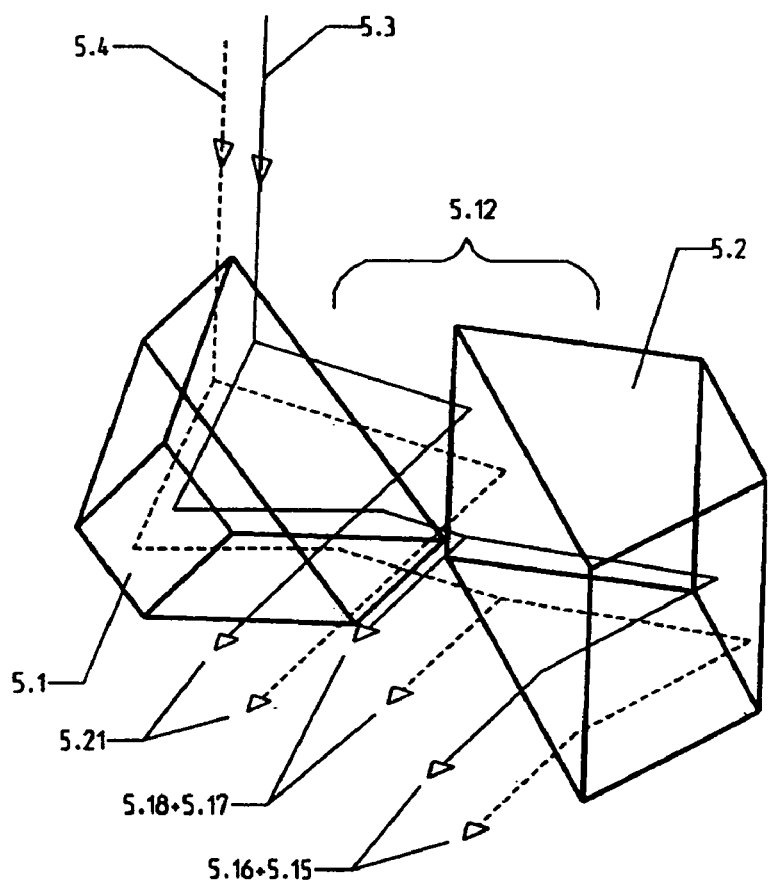

It is of course also possible to combine a transmitting beam splitter in accordance with FIG. 4 and a reflecting beam splitter in accordance with FIG. 5 to form an axis splitter. Regarding the spatial arrangement, both placement options can be realized.

Figure 6:
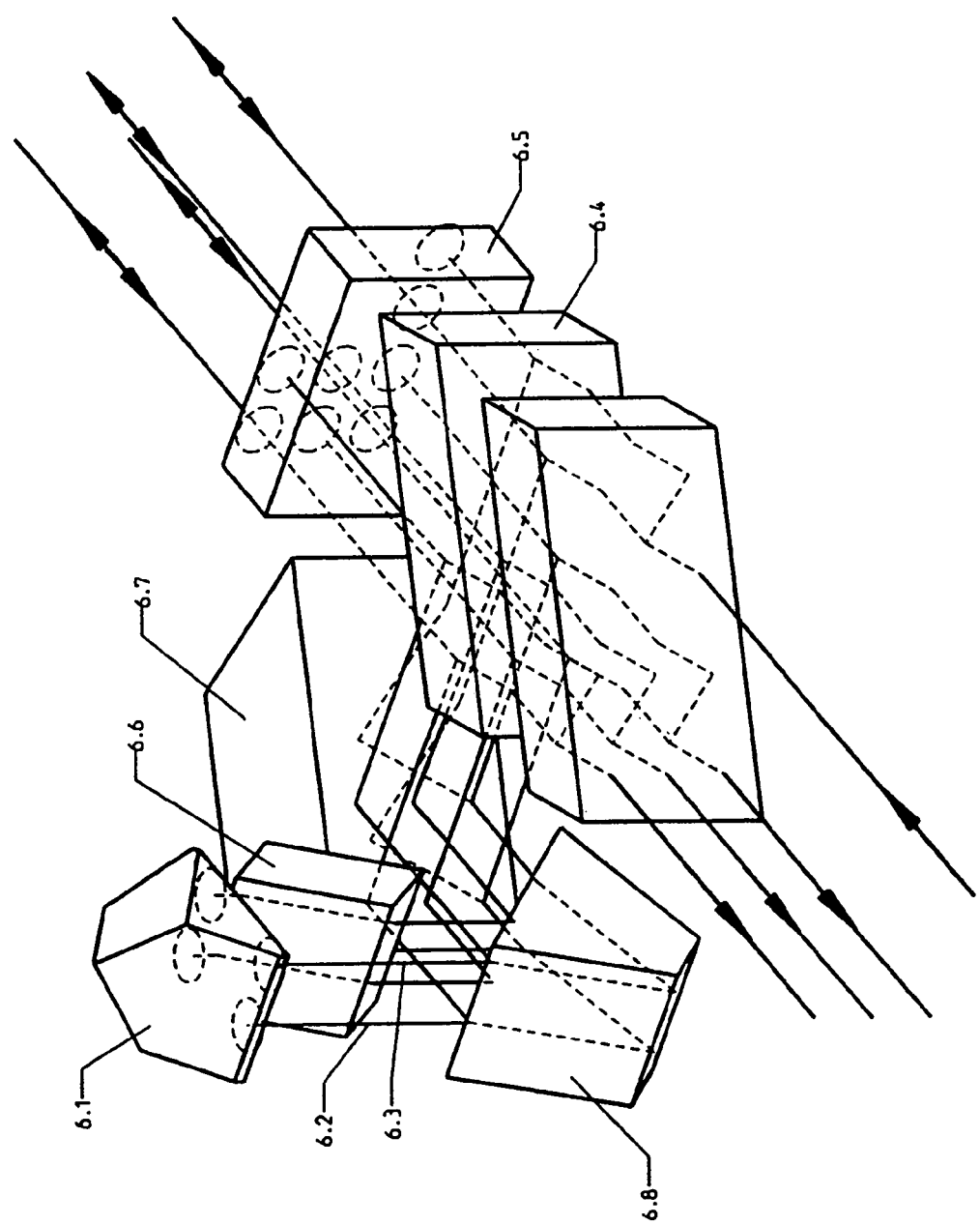
FIG. 6 is a spatial plan view of an embodiment of a multi-axis interferometer, in which an axis splitter in accordance with FIG. 5 is used, in accordance with the present invention.

Finally, FIG. 6 shows a preferred embodiment of a multi-axis interferometer in accordance with FIG. 3, in particular a three-axis interferometer using the axis splitter explained by FIG. 5. In this case it is especially advantageous that, because of beam splitting at the surface and reflection at the rear, not only the primary measuring beams 6.2 and reference beams 6.3 reflected at the triple prism 6.1 are being passed over or through the combination of the two plane-parallel plates 6.7, 6.8 of the axis splitter and thus are divided onto three axes, but that on their way from the beam deflector 6.4 to the triple prism 6.1 the primary measuring and reference beams also pass via two surface reflections over the axis splitter. In this case the coatings of the plane-parallel plates for these beams running in the direction toward the triple prism 6.1 are laid out as surface mirrors. The beam pattern at the reference plane mirror 6.5 is indicated by circles.

For the sake of clarity, the quarter-wave plates and the measuring mirror have not been drawn in FIG. 6. Moreover, for structural reasons a plane-parallel plate 6.6 has been inserted in order to parallel offset the beam pair running in the direction of the triple prism 6.1.

The steps explained by the various drawing figures can of course also be suitably combined with each other, etc. Thus, within the scope of the present invention a number of further embodiment options exist, all of which are based on the above discussed principles.

The foregoing description is provided to illustrate the invention, and is not to be construed as a limitation. Numerous additions, substitutions and other changes can be made to the invention without departing from its scope as set forth in the appended claims.

We claim:

1. An optical assembly of an interferometer, comprising:
   a beam splitter for dividing the beams emitted by a radiation source into at least one measuring and one reference beam;
   at least one measuring and one reference mirror, arranged along at least two measuring axes, on which the measuring and the reference beams impinge, respectively, wherein respectively at least one of the mirrors is displaceable along a respective one of the at least two measuring axes;
   a beam deflector, as well as a retro-reflector, wherein the measuring and the reference beams reflected at the measuring and the reference mirrors are received by both the beam deflector and the retro-reflector and are guided by the beam deflector and the retro-reflector at least a second time in a direction toward the measuring and the reference mirrors;
   an axis splitter, arranged between the beam deflector and the retro-reflector, which divides the measuring and the reference beams so as to be parallel to the at least two measuring axes, wherein the axis splitter comprises at least one plane-parallel plate.

2. An interferometer, comprising:
   a radiation source;
   an optical assembly comprising:
      a beam splitter for dividing the beams emitted by a radiation source into at least one measuring and one reference beam;
      at least one measuring and one reference mirror, arranged along at least two measuring axes, on which the measuring and the reference beams impinge, respectively, wherein respectively at least one of the mirrors is displaceable along a respective one of the at least two measuring axes;
      a beam deflector, as well as a retro-reflector, wherein the measuring and the reference beams reflected at the measuring and the reference mirrors are received by both the beam deflector and the retro-reflector and are guided by the beam deflector and the retro-reflector at least a second time in the direction toward the measuring and the reference mirrors;
      an axis splitter, arranged between the beam deflector and the retro- reflector, which divides the measuring and the reference beams so as to be parallel to the at least two measuring axes, wherein the axis splitter comprises at least one plane-parallel plate;
      at least two detectors, on which the measuring and the reference beams impinge following the second reflection at the measuring and the reference mirrors in the at least two measuring axes, wherein one of the at least two detectors generates an output signal as a function of a displacement of the measuring mirror relative to one of the at least two measuring axes and another one of the at least two detectors generates an output signal as a function of a displacement of the measuring mirror relative to another of the at least two measuring axes.

3. An optical assembly of an interferometer, comprising:

a beam splitter for dividing the beams emitted by a radiation source into a measuring and a reference beam;

at least one measuring and one reference mirror, arranged along at least two measuring axes, on which the measuring and the reference beams impinge, respectively, wherein respectively at least one of the mirrors is displaceable along a respective one of the at least two measuring axes;

a beam deflector, as well as a retro-reflector, wherein the measuring and the reference beams reflected at the measuring and the reference mirrors are received by both the beam deflector and the retro-reflector and are guided by the beam deflector and the retro-reflector at least a second time in the direction toward the measuring and the reference mirrors;

an axis splitter, arranged between the beam deflector and the retro-reflector, which divides the measuring and the reference beams so as to be parallel to the at least two measuring axes, wherein a measuring and a reference mirror is co-linearly arranged along each of the at least two measuring axes.

4. An interferometer, comprising:

a radiation source;

an optical assembly comprising:

a beam splitter for dividing the beams emitted by a radiation source into a measuring and a reference beam;

at least one measuring and one reference mirror, arranged along at least two measuring axes, on which the measuring and the reference beams impinge, respectively, wherein respectively at least one of the mirrors is displaceable along a respective one of the at least two measuring axes;

a beam deflector, as well as a retro-reflector, wherein the measuring and the reference beams reflected at the measuring and the reference mirrors are received by both the beam deflector and the retro-reflector and are guided by the beam deflector and the retro-reflector at least a second time in the direction toward the measuring and the reference mirrors;

an axis splitter, arranged between the beam deflector and the retro-reflector, which divides the measuring and the reference beams so as to be parallel to the at least two measuring axes, wherein a measuring and a reference mirror is co-linearly arranged along each of the at least two measuring axes; and at least two detectors, on which the measuring and the reference beams impinge following the second reflection at the measuring and the reference mirrors in the at least two measuring axes, wherein one of the at least two detectors generates an output signal as a function of a displacement of the measuring mirror relative to one of the at least two measuring axes and another one of the at least two detectors generates an output signal as a function of a displacement of the measuring mirror relative to another of the at least two measuring axes.

* * * * *